Dec. 18, 1956 G. W. PONTIUS III 2,774,445
BRAKE ADJUSTOR
Filed Oct. 31, 1951 2 Sheets-Sheet 1

INVENTOR.
GEORGE W. PONTIUS III
BY
G. A. Guest
ATTORNEY

Dec. 18, 1956   G. W. PONTIUS III   2,774,445
BRAKE ADJUSTOR
Filed Oct. 31, 1951   2 Sheets-Sheet 2

INVENTOR.
GEORGE W. PONTIUS III
BY
G. A. Gust
ATTORNEY

United States Patent Office 2,774,445
Patented Dec. 18, 1956

2,774,445
BRAKE ADJUSTOR

George W. Pontius III, South Bend, Ind., assignor to Bendix Aviation Corporation, South Bend, Ind., a corporation of Delaware Application October 31, 1951, Serial No. 254,049

19 Claims. (Cl. 188—79.5)

The present invention relates to brakes and more particularly to drum brakes of the internally expanding shoe type.

Heretofore, many devices have been developed for automatically adjusting the friction elements of a brake to compensate for wear of the friction surfaces of said elements. For various reasons, such prior devices have not proven commercially practicable, and those few actually adopted for commercial exploitation have been attended with serious deficiencies. A few of these reasons and deficiencies include the features of (a) high cost, (b) undue complexity, (c) inefficient operation, (d) unreliable operation, and (e) over-adjustment. From a performance standpoint, the last-mentioned of these features presents probably the most serious deficiency, because if the adjusting device does not take into account thermal expansion and distortion of the drum, an adjustment will be automatically effected, as the drum expands or distorts, which adjusts the element toward the drum. Then as the drum contracts, the friction elements will fit too closely in the drum and in some instances will seize therein and lock the drum against rotation.

In order to overcome this over-adjustment, it has been suggested that a "feeler" be utilized in combination with the adjusting device, which actually engages the drum during brake application and which effectively serves to sense brake lining wear and to cause an automatic brake adjustment only when necessary. However, one major difficulty experienced with this arrangement is that the "feeler" wears because of attrition with the drum and thereby eventually fails to provide the proper adjustment or any adjustment at all.

It is, therefore, a principal object of this invention to overcome the above-mentioned deficiencies of prior developments and to provide a novel adjusting device which will automatically maintain a desirable shoe-to-drum clearance through the wear-life of the friction surfaces.

It is a further object to provide means for automatically adjusting the friction device of the brake only on reverse braking.

Another object of this invention is to provide an automatic adjustment which will not over-adjust the brake friction device during the normal wear-life of the friction surfaces.

Other objects will become apparent as the description proceeds.

Figure 1:
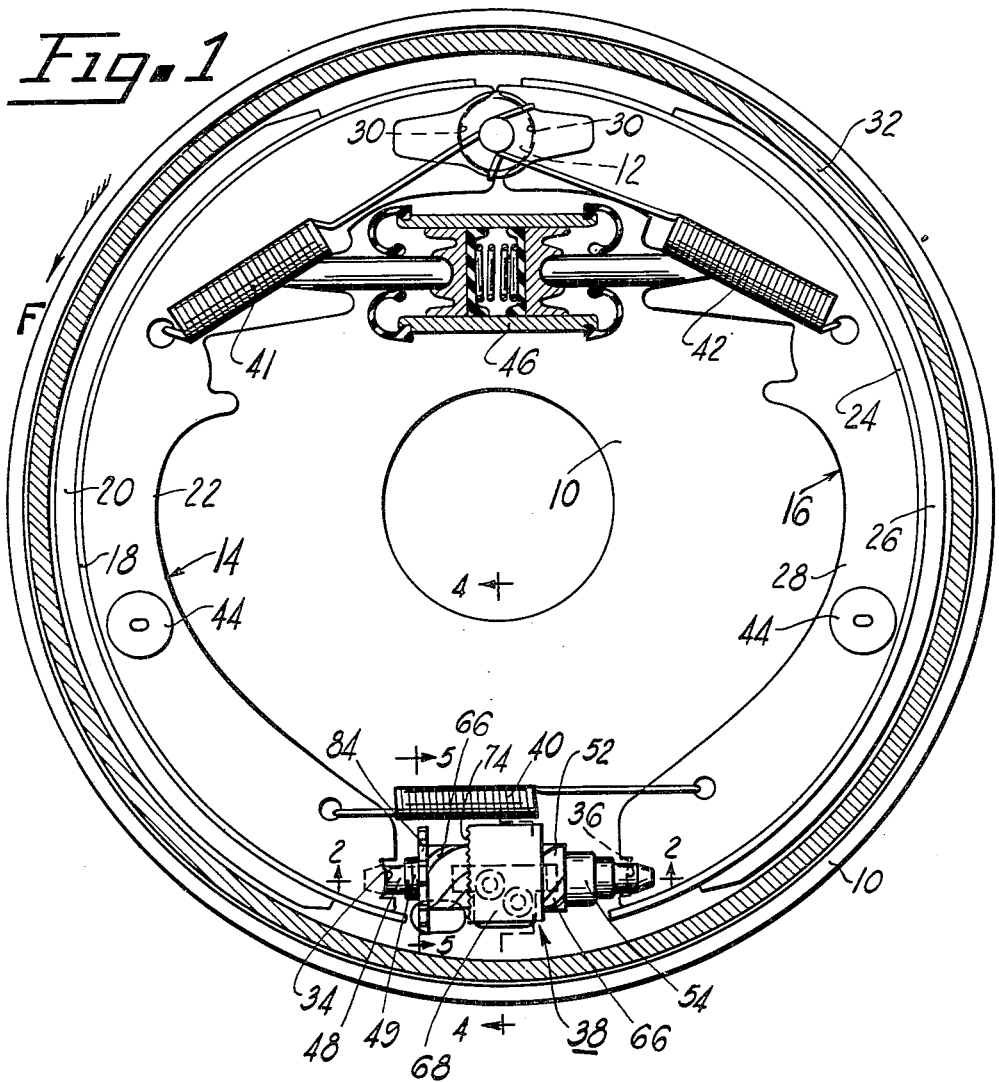
Figure 1 is a side elevation of an embodiment of this invention.

Referring to the drawings for the specific details of the aforementioned embodiment of this invention, a brake backing plate or supporting member 10 preferably formed of suitable sheet metal is adapted to be secured to a nonrotatable part of a vehicle and is provided at one side thereof with an anchor post 12. A friction device comprising a pair of circumferentially arranged T-section brake shoes 14 and 16 are mounted on this plate 10. These shoes as illustrated are of identical construction but need not be as will become apparent later in the description. In this instance, shoe 14 is comprised of an arcuate rim 18 which carries a segment of conventional composition friction lining 20, and a reinforcing web 22. Shoe 16 is likewise composed of a rim 24, a lining segment 26, and a web 28. The upper adjacent ends of the webs 22 and 28 are notched as at 30 to fit the outer contour of anchor 12 for positioning the shoes within the rotatable drum 32. The lower adjacent ends of these webs 22 and 28 are formed with suitable facing, rectangular notches 34 and 36 respectively, which receive the ends of a thrust link assembly generally indicated by reference numeral 38. Tension springs 40, 41, and 42 are each connected to the shoes 14 and 16 in such a manner as to draw said shoes into thrust engagement with both the anchor 12 and link assembly 38. Thus it is seen that in effect the friction device illustrated is comprised of articulated shoes, and is substantially positioned within the drum by means of the anchor 12. Conventional, spring type hold down devices 44 are preferably used to position frictionally said shoes on the backing plate 10 when the shoes are in the brake-released condition illustrated.

Any suitable means may be used for actuating the brake and as illustrated, a double piston, hydraulic cylinder 46 is secured to backing plate 10 near anchor 12 to spread the anchor ends of the shoes radially outwardly into engagement with drum 32.

Briefly, the brake is operated by injecting fluid pressure into cylinder 46 for spreading the anchor ends of the shoes, and if the drum is rotating in forward direction as depicted by the arrow F, the engagment of the shoes with the drum will tend to rotate both shoes therewith, whereby the anchor end of shoe 16 will engage anchor 12 while the corresponding end of shoe 14 will separate therefrom. Also the frictional force of drum engagement of shoe 14 will be transmitted through link assembly 38 to the lower end of shoe 16 to apply this latter shoe into the drum. For the opposite direction of drum rotation, the reverse conditions prevail, shoe 14 anchoring on post 12 and shoe 16 separating therefrom.

It is to be understood that while an articulated two shoe, shiftable anchorage brake is disclosed, the invention may be embodied in other suitable brake configurations without departing from the scope thereof. For example, any brake which makes use of jointed shoes may be used in an embodiment of this invention.

Referring now to the thrust link assembly 38 with which this invention is principally concerned, a stud 48, provided with external right-hand threads 49, has a notch 50 which is received by the recess 34 of shoe 14 to straddle snugly the web 22.

An internally threaded sleeve 52 is received on the threaded portion of the stud 48 and is of sufficient length to project beyond the right-hand end of said stud. A cylindrical fitting or thrust connection 54 is provided with a reduced end portion 56 which is fitted into the projecting end of sleeve 52 for rotary movement relative thereto. As seen more clearly in Figure 2, this reduced end portion 56 is provided with a peripheral groove 58 for receiving a washer type spring 60 (see Figure 3) which frictionally engages both the sleeve 52 and the bottom of the groove 58 to resist relative rotation therebetween. The right-hand end of connection 54 is slotted at 62 for embracing the web 28 of shoe 16 within the confines of notch 36. A radial shoulder 64 is further provided on connection 54 for thrust engagement with the right-hand end of sleeve 52. Thus it is seen that if a force is imposed on one end of the assembly 38, for example on the left-hand end toward the other end, such force will be transmitted through the stud 48; sleeve 52; fitting 54; and into the shoe 16.

A left-hand helix or worm thread 66 is cut into the outer peripheral surface of sleeve 52 and is made of substantially greater pitch than that of the threads of stud 48. A shuttle nut 68 provided with an internal worm thread is received by said external thread 66 for relatively free rotational and axial movement on the sleeve 52. This nut 68 is further provided with an undercut portion 70 which receives a friction spring 72 which for all intents and purposes is the same as the aforementioned spring 60. The specific purpose of this spring 72 is to resist relative rotation between shuttle nut 68 and the sleeve 52, and it should be appreciated at this point that the spring 60 is made to provide more frictional resistance to rotation of its engaged parts than does the spring 72 for its respective parts.

The reason for this difference in spring forces will become apparent hereafter.

Figure 2:
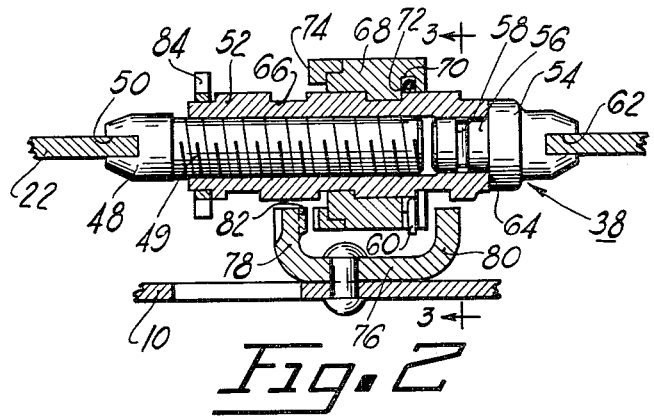
Figure 2 is a partial section taken substantially on section line 2—2 of Figure 1.
Figure 3:
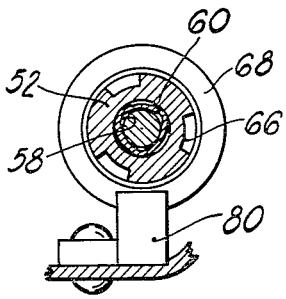
Figure 3 is a similar section taken substantially on section line 3—3 of Figure 2.
Figure 4:
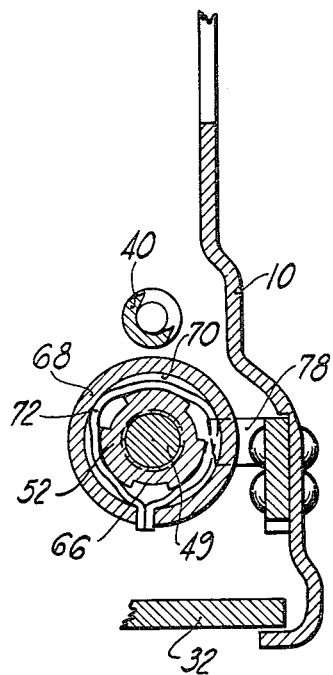
Figure 4 is another partial section taken substantially on section line 4—4 of Figure 1.
Figure 5:
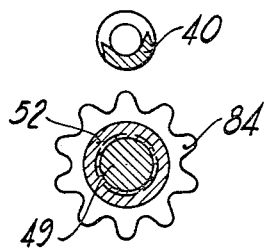
Figure 5 is still another partial section taken substantially on section line 5—5 of Figure 1.

As viewed more clearly in Figures 1 and 2, the left-hand side of the nut 68 is provided with peripherally arranged rachet teeth or serrations 74 which serve a purpose to be explained hereinafter.

Secured to the backing plate 10 adjacent the link assembly 38 is a bracket 76 having two spaced upstanding legs 78 and 80. These legs 78 and 80 are so positioned as to straddle longitudinally the nut 68 thereby definitely limiting the axial movement of nut 68 with respect to, for example, the backing plate 10. A tooth 82 is provided on the inside of leg 78 and is engageable with serrations 74 for preventing rotation of nut 68. It will be noted by reference to Figure 2 that a slight clearance is provided between both legs 78 and 80 and the respective sides of shuttle nut 68, the purpose of which to be explained in more detail hereafter.

A star wheel 84 is suitably secured to the left-hand end of sleeve 52 to provide manual adjustment of the link assembly 38 whenever necessary.

In operation, assuming the drum to be rotating in the direction of the arrow F, application of the brake will result in the brake shoes 14 and 16 shifting circumferentially with respect to the backing plate 10 in a counter-clockwise direction. As these two shoes shift, of course, the thrust assembly 38 will likewise shift carrying with it the shuttle nut 68. The link assembly 38 may be initially adjusted so that for the first number of brake applications, shuttle nut 68 will not engage leg 80; however, if such adjustment should not have been made, engagement of the shuttle nut 68 with the leg or abutment 80 will result in this nut being turned on the worm threads 68 and moved, or preset, to the left on sleeve 52. Thus, on the next few succeeding brake applications shuttle nut 68 should not engage leg 80 sufficiently to move it again on sleeve 52.

Now assuming that the brake has been operated sufficiently to cause lining wear in an amount which necessitates an adjustment of the shoe-to-drum clearance, an application of the brake, while the drum is rotating in a direction opposite to that of the arrow F, will cause the assembly 38 to be shifted toward the left until the shoes 14 and 16 are in complete frictional engagement with the drum. When this occurs, the serrated edge 74 of preset shuttle nut 68 will engage the tooth 82 of bracket 76 whereupon rotational movement of shuttle nut 68 will be positively prevented. Since the frictional force of the brake drum and the force of wheel cylinder 46 on the shoe 16 conjointly act to force the sleeve 52 toward the left, said sleeve will virtually be screwed or rotated inside nut 68 because of the worm thread connection therebetween. Since the sleeve 52 and stud 48 are connected by means of threads, rotation of sleeve 52 on stud 48 will produce relative axial movement therebetween, and the threads 49 being arranged in proper relation with the worm thread 66, this particular action will cause sleeve 52 and stud 48 to be moved axially apart so as to increase the distance between the lower brake shoe ends. Thus it is seen that by a reverse braking action, the shoe-to-drum clearance has been decreased and adjusted an amount corresponding to the previously mentioned preset position of nut 68 on sleeve 52.

Since a brake is in need of only occasional adjustment, and since brakes are preponderantly used in forward direction of drum rotation, it is logical that adjustments take place only during reverse braking. In the above described arrangement, adjustments will take place only in the reverse direction of drum rotation; however, it should be recognized as an important feature of this invention, only a single adjustment will take place for any number of consecutive reverse applications which do not cause lining wear. This is important since a moderate number of repeated, succeeding reverse applications will not cause overadjustment. Before an adjustment can normally take place, it is necessary that the shuttle nut 68 be preset by forward brake applications.

A satisfactory design of the link assembly 38 has been developed in which each single revolution of the sleeve 52 provides fifty thousandths inch (0.050 inch) brake adjustment. The worm thread 66 has been designed to provide one revolution in two axial inches of movement of the shuttle nut 68. As a matter of fact, the particular pitch ratio between the worm thread 66 and the threads provided on stud 48 may be determined by experiment for any particular brake design, and logically may vary with design preferences. In a conventional eleven inch (11″) brake, the aggregate clearance provided between legs 78 and 80 and the shuttle nut 68 is made three sixteenths of an inch. As shown in Figure 2, the shuttle nut 68 in its initial adjustment is substantially centered between these two legs 78 and 80.

It may be shown that this particular adjustment for practical purposes is incapable of overadjusting, or that if it is forced to overadjust, the friction linings 20 and 26 will no longer be useable. For example, assuming that the drum develops a thermal expansion in diameter a maximum amount of three sixteenths of an inch during a severe forward braking application, the shuttle nut 68 would tend to move a distance corresponding to shoe-to-drum clearance plus the three sixteenths inch drum expansion. In this movement, the shuttle nut would engage leg 80 and be thereby shifted toward the left on sleeve 52. Upon release of the brake, the shoes 14 and 16 will be returned to their released positions by the return springs 41 and 42. When this occurs, the assembly 38 will shift toward the left and since the shuttle nut 68 previously received a substantial movement on the sleeve 52, the serrations 74 will be engaged by the tooth 82. This, of course, prevents rotation of the nut 68 whereupon the engagement of the cooled and contracted drum with the shoe 16 will force the sleeve 52 toward the left and cause a clearance adjustment. However, since the pitch ratio between the worm thread 66 and the threads on stud 48 are so properly proportioned, only a tiny adjustment is effected thereby insuring against this particular single adjustment of forcing the shoes radially outwardly far enough to be seized within the contracted drum. If an equally severe succeeding application of the brake should again cause the drum to expand its extreme amount of three sixteenths of an inch, the shuttle nut 68 will not be forced as far toward the left on sleeve 52 as it was previously since it must traverse the entire distance between engagement with tooth 82 and the leg 80 which, as stated previously, was approximately three sixteenths of an inch. Thus when the brake is released again, only slight relative axial movement between the sleeve 52 and the nut 68 will result after engagement of nut 68 with leg 78; consequently extremely slight relative rotation will be produced between sleeve 52 and nut 68. Thus on the second adjustment, the shoes were adjusted only an infinitesimal amount which, in practical applications, may be ignored. With the present arrangement, and by using conventional composition friction linings for the brake shoes 14 and 16, repeated severe stops of the drum rotating in the direction of the arrow F which would cause sufficient lining wear, drum distortion, and drum expansion might produce overadjustment of the brake shoes; however, experimentation has shown that if the proper spacing is chosen between the legs 78 and 80, this overadjustment can be entirely eliminated or if it should occur, the severity of the brake applications would result in complete destruction of the linings, so that the particular overadjustment would obviously be of no consequence since the linings would have to be replaced anyway.

As hereinabove mentioned, the washer-like spring 60 is made to exert a superior frictional force against relative rotation between the sleeve 52 and the connection 54 as compared to the similar resistance provided by spring 72 between shuttle nut 68 and the sleeve 52. This comparative resistance against frictional rotation is desirable, because when the shuttle nut 68 is moved into engagement with the leg 80 during a brake application, the shuttle nut 68 will rotate about sleeve 52 and thereby not cause any rotation between sleeve 52 and the stud 48. If rotation were caused between these latter mentioned parts, a back-off adjustment would obviously occur which would not be desired.

Although only one embodiment of the invention has been illustrated and described, various changes in the form and relative arrangements of the parts may be made to suit requirements.

I claim:

1. An internally expanding drum brake device for use with a rotatable drum comprising a supporting plate, two circumferentially arranged T-section shoes carried by said supporting plate, each shoe having a rim and a web, one pair of adjacent shoe ends being arranged to be spread apart, anchor means carried by said supporting plate and selectively engageable by either of said shoe ends, and means for spreading said ends apart to force said shoes into frictional engagement with said drum, the other pair of adjacent shoe ends being connected together by means of a thrust link assembly, said assembly comprising an externally threaded stud having a transverse notch in one end thereof arranged to receive the end of one of the shoe webs, an internally threaded hollow sleeve received on said stud and extending beyond the end of said stud remote from said notch, a cylindrical fitting journaled in the remote portion of said sleeve and having a radial shoulder which abuts against the adjacent end surface of said sleeve, the outer end of said fitting being provided with a notch which receives the end of the other shoe web, a worm thread provided on the external surface of said sleeve, a shuttle nut rotatably received on said sleeve and arranged to engage said worm thread, one radial side of said shuttle being provided with peripherally arranged laterally projecting serrations, first friction means interposed between said shuttle nut and said sleeve to resist relative rotation between these two parts, second friction means interposed between said sleeve and said fitting to likewise resist relative rotation between these latter-mentioned two parts, and a U-shaped bracket secured to said supporting plate with its legs upstanding to straddle axially said shuttle nut, one of said legs being provided with a tooth arranged to cooperatively engage the serrations on said shuttle nut to at times prevent the latter from rotating, said legs being spaced apart a predetermined distance to allow said shuttle nut to move axially a limited distance, all of the aforementioned parts of said thrust link assembly being so constituted and arranged as to cause said connected shoe ends to be adjusted apart during forceful movement of said assembly in a direction to maintain engagement of said tooth with said serrations.

2. An internally expanding drum brake device for use with a brake drum comprising a supporting plate, two circumferentially arranged T-section shoes carried by said supporting plate, each shoe having a rim and a web, one pair of adjacent shoe ends being arranged to be spread apart, anchor means carried by said supporting plate and selectively engageable by either of said shoe ends, and means for spreading said ends apart to force said shoes into frictional engagement with said drum, the other pair of adjacent shoe ends being connected together by means of a thrust link assembly, said assembly comprising an externally threaded stud having a transverse notch in one end thereof arranged to receive the end of one of the shoe webs, an internally threaded hollow sleeve received on said stud and extending beyond the end of said stud remote from said notch, a cylindrical fitting journaled in the remote portion of said sleeve and having a radial shoulder which abuts against the adjacent end surface of said sleeve, the outer end of said fitting being provided with a notch which receives the end of the other shoe web, a worm thread provided on the external surface of said sleeve, a shuttle nut rotatably received on said sleeve and arranged to engage said worm thread, one radial side of said shuttle being provided with peripherally arranged laterally projecting serrations, and a U-shaped bracket secured to said supporting plate with its legs upstanding to straddle axially said shuttle nut, one of said legs being provided with a tooth arranged to cooperatively engage the serrations on said shuttle nut to prevent selectively the latter from rotating, said legs being spaced apart a predetermined distance to allow said shuttle nut to move axially a limited distance, all of the aforementioned parts of said thrust link assembly being so constituted and arranged as to cause said connected shoe ends to be adjusted apart during forceful movement of said assembly in a direction to maintain engagement of said tooth with said serrations.

3. An internally expanding drum brake device for use with a brake drum comprising a supporting plate, two circumferentially arranged T-section shoes carried by said supporting plate, each shoe having a rim and a web, one pair of adjacent shoe ends being arranged to be spread apart, anchor means carried by said supporting plate and selectively engageable by either of said shoe ends, and means for spreading said ends apart to force said shoes into frictional engagement with said drum, the other pair of adjacent shoe ends being connected together by means of a thrust link assembly, said assembly comprising an externally threaded stud having a transverse notch in one end thereof arranged to receive the end of one of the shoe webs, an internally threaded hollow sleeve received on said stud and extending beyond the end of said stud remote from said notch, a cylindrical fitting having a notch embracing the end of the other shoe web and a portion journaled in the aforementioned remote end of said sleeve, a worm thread provided on the external surface of said sleeve, a shuttle nut rotatably received on said sleeve and arranged to engage said worm thread, one radial side of said shuttle being provided with peripherally arranged laterally projecting serrations, and a U-shaped bracket secured to said supporting plate with its legs upstanding to straddle axially said shuttle nut, one of said legs being provided with a tooth arranged to cooperatively engage the serrations on said shuttle nut to prevent selectively the latter from rotating, said legs being spaced apart a predetermined distance to allow said shuttle nut to move axially a limited distance, all of the aforementioned parts of said thrust link assembly being so constituted and arranged as to cause said connected shoe ends to be adjusted apart during forceful movement of said assembly in a direction to maintain engagement of said tooth with said serrations.

4. An internally expanding drum brake device for use with a brake drum comprising a supporting plate, two circumferentially arranged T-section shoes carried by said supporting plate, each shoe having a rim and a web, one pair of adjacent shoe ends being arranged to be spread apart, anchor means carried by said supporting plate and selectively engageable by either of said shoe ends, and means for spreading said ends apart to force said shoes into frictional engagement with said drum, the other pair of adjacent shoe ends being connected together by means of a thrust link assembly, said assembly comprising an externally threaded stud having a transverse notch in one end thereof arranged to receive the end of one of the shoe webs, an internally threaded hollow sleeve received on said stud and extending beyond the end of said stud remote from said notch, a fitting having a notch embracing the end of the other shoe web and a portion journaled in the aforementioned remote end of said sleeve, a worm thread provided on the external surface of said sleeve, a shuttle nut rotatably received on said sleeve and arranged to engage said worm thread, one radial side of said shuttle being provided with peripherally arranged laterally projecting serrations, and a tooth element provided on said supporting plate in cooperative juxtaposition with said serrations to prevent selectively said shuttle nut from rotating, all of the aforementioned parts of said thrust link assembly being so constituted and arranged as to cause said connected shoe ends to be adjusted apart during forceful movement of said assembly in a direction to maintain engagement of said tooth element with said serrations.

5. An internally expanding drum brake device for use with a brake drum comprising a supporting plate, two circumferentially arranged T-section shoes carried by said supporting plate, each shoe having a rim and a web, one pair of adjacent shoe ends being arranged to be spread apart, anchor means carried by said supporting plate and selectively engageable by either of said shoe ends, and means for spreading said ends apart to force said shoes into frictional engagement with said drum, the other pair of adjacent shoe ends being connected together by means of a thrust link assembly, said assembly comprising an externally threaded stud having a thrust connection with the end of one of the shoe webs, said thrust connection being such as to prevent relative rotation of the threaded stud and the respective shoe web, an internally threaded sleeve received on said stud, a fitting having a thrust connection with the end of the other shoe web and abutting engagement with said sleeve, said last-mentioned connection also preventing relative rotation between this fitting and the last-mentioned shoe web, said stud, said sleeve, and said fitting being so arranged as to maintain the distance between the latter-mentioned shoe ends in accordance with the axial position of said sleeve on said stud, a worm thread provided on the external surface of said sleeve, a shuttle nut rotatably received on said sleeve and arranged to engage said worm thread, serrations peripherally arranged on one side of said shuttle nut, and a tooth element provided on said supporting plate in cooperative juxtaposition with said serrations to at times prevent said shuttle nut from rotating, all of the aforementioned parts of said thrust link assembly being so constituted and arranged as to cause said connected shoe ends to be adjusted apart during forceful movement of said assembly in a direction to maintain engagement of said tooth element with said serrations.

6. An internally expanding drum brake device for use with a brake drum comprising a nonrotatable supporting member, at least two circumferentially arranged radially expansible brake shoes carried by said supporting member, and an adjustable thrust link connecting one set of adjacent shoe ends, said thrust link comprising a threaded member having one end connected to one of said shoe ends in such a manner as to prevent rotation of said threaded member about the axis of the threads, an internally threaded sleeve received on said threaded member, a thrust element interposed between the other of said shoe ends and said sleeve whereby relative axial movement between said sleeve and said threaded member will cause the distance between the shoe ends of said set to be varied, said sleeve being provided on its outer peripheral surface with a worm thread, a shuttle nut engaging said worm thread for movement axially of said sleeve, one lateral side of said shuttle nut being provided with peripherally arranged serrations, and an abutment secured to said supporting member and having a part positioned to cooperatively engage said serrations to at times prevent rotation of said shuttle nut, all of the aforementioned parts of said thrust link being so constituted and arranged as to cause said shoe ends to be adjusted apart during forceful movement of said thrust link in a direction to maintain operative engagement of said abutment with said serrations.

7. An internally expanding drum brake device for use with a brake drum comprising a nonrotatable supporting member, at least two circumferentially arranged radially expansible brake shoes carried by said supporting member, and an adjustable thrust link connecting one set of adjacent shoe ends, said thrust link comprising a threaded member having one end connected to one of said shoe ends in such a manner as to prevent rotation of said threaded member about the axis of the threads, an internally threaded sleeve received on said threaded member, a thrust element interposed between the other of said shoe ends and said sleeve whereby relative axial movement between said sleeve and said threaded member will cause the distance between the shoe ends of said set to be varied, said sleeve being provided on its outer peripheral surface with a worm thread, a shuttle nut engaging said worm thread for movement axially of said sleeve, one lateral side of said shuttle nut being provided with peripherally arranged serrations, and a U-shaped abutment bracket secured to said supporting member with its legs upstanding to straddle axially and be engageable by said shuttle nut, one of said legs having a tooth disposed to cooperatively engage said serrations to at times prevent said shuttle nut from rotating, said legs being spaced apart, a predetermined distance to allow said shuttle nut to move axially a predetermined amount, all of the aforementioned parts of said thrust link being so constituted and arranged as to cause said shoe ends to be adjusted apart during forceful movement of said thrust link in a direction to maintain operative engagement of said tooth with said serrations.

8. A brake mechanism for use with a rotatable drum comprising a nonrotatable supporting member, at least two circumferentially arranged brake shoes carried by said supporting member, and an adjustable thrust link connecting one set of adjacent shoe ends, said thrust link comprising a first threaded member connected to one of said shoe ends against rotation about the axis of the threads, a second member adjustably received on the threads of said first member, a thrust element interposed between the other of said shoe ends and said second member whereby relative movement between said first and second members by means of the threaded connection therebetween will result in the distance between the shoe ends of said set being varied, said second member being externally threaded about an axis coincident with the axis of the threads of said first member, the external threads on said second member being of greater pitch than the first-mentioned threads, an annular member engageable with the external threads of said second member so as to be adjustable along the extent of said external threads, first friction means provided on said annular member, and second friction means provided on said supporting member for selective engagement with said first friction means in such a manner that engagement of said friction means will resist turning movement of said annular member, said thrust link being movable to control said last-mentioned engagement, all of the aforementioned parts of said thrust link being so constituted and arranged as to cause said shoe ends to be adjusted apart during movement of said thrust link in a direction to maintain engagement of said friction means.

9. A brake mechanism for use with a rotatable drum comprising a nonrotatable supporting member, at least two friction elements carried by said supporting member and having at least one set of adjacent ends, and an adjustable thrust link connecting said adjacent ends, said thrust link comprising a first threaded member connected to one of said ends against rotation about the axis of the threads, a second member adjustably received on the threads of said first member, said second member operatively engaging the other of said ends whereby relative movement between said first and second members by means of the threaded connection therebetween results in varying the distance between said adjacent ends, said second member being externally threaded about an axis coincident with the axis of the threads of said first member, the external threads on said second member being of greater pitch than the first-mentioned threads, an annular member engageable with the external threads of said second member so as to be adjustable along the extent of said external threads, first friction means provided on said annular member, and nonrotatable second friction means arranged to engage selectively said first friction means in such a manner that engagement of said friction means will resist turning movement of said annular member, said thrust link being movable to control said last-mentioned engagement, all of the aforementioned parts of said thrust link being so constituted and arranged as to cause said adjacent ends to be adjusted apart during movement of said thrust link in a direction to maintain engagement of said friction means.

10. A brake mechanism for use with a rotatable drum comprising a nonrotatable supporting member, a plurality of friction elements carried by said supporting member and having at least one set of adjustable adjacent ends, and an adjustable thrust link connecting said adjacent ends, said thrust link comprising a threaded member having one end connected to one of said ends in such a manner as to prevent rotation of said threaded member about the axis of the threads, an internally threaded sleeve received on said threaded member, a thrust element interposed between the other of said ends and said sleeve whereby relative axial movement between said sleeve and said threaded member will cause the distance between said ends to be varied, said sleeve being provided on its outer peripheral surface with a worm thread, a shuttle nut engaging said worm thread for movement axially of said sleeve, one lateral side of said shuttle nut being provided with peripherally arranged serrations, and two spaced abutments secured to said supporting member to straddle axially and be engageable by said shuttle nut, one of said abutments having a tooth disposed to cooperatively engage said serrations to prevent at times rotation of said shuttle nut, said abutments being spaced apart a predetermined distance to allow said shuttle nut to move axially a predetermined amount, all of the aforementioned parts of said thrust link being so constituted and arranged as to cause said shoe ends to be adjusted apart during forceful movement of said thrust link in a direction to maintain operative engagement of said tooth with said serrations.

11. A brake mechanism for use with a rotatable drum comprising a nonrotatable supporting member, a friction device carried by said supporting member and having at least two adjacent adjustable ends, and an adjustable thrust link connecting said adjacent ends, said thrust link comprising a first threaded member connected to one of said ends in a manner preventing rotation about the axis of the threads, a second member adjustably received on the threads of said first member, said second member operatively engaging the other of said ends whereby relative movement between said first and second members by means of the threaded connection therebetween results in varying the distance between said ends, a third member carried by said second member and displaceable along the length thereof, an abutment carried by said supporting member and extending therefrom into operative engagement with said third member, said third member and said abutment being so arranged that movement of said thrust link in one direction will cause engagement of said third member and said abutment and result in relative rotation between said first and second members whereby the distance between said ends will be varied.

12. A brake mechanism for use with a rotatable drum comprising a friction device having at least two adjacent adjustable ends, and an adjustable link connecting said adjacent ends, said link comprising a first threaded member connected to one of said ends against rotation about the axis of the threads, a second member adjustably received on the threads of said first member, said second member operatively engaging the other of said ends whereby relative movement between said first and second members by means of the threaded connection therebetween results in varying the distance between said ends, a third member carried by said second member and movable along the length thereof, two spaced abutments arranged to operatively engage opposite sides of said third member which is shiftable between said spaced abutments, said third member and said abutment being further arranged whereby movement of said link in a predetermined direction will cause engagement of said third member and said abutment and result in relative rotation between said first and second members, this last-mentioned relative rotation causing a variation of the distance between said ends.

13. An adjusting device for a brake mechanism comprising an externally threaded member adapted to be connected at one end to a brake shoe, an internally threaded sleeve received on said member, a thrust element operatively engaging said sleeve and being adapted to be connected to another brake shoe, a worm thread provided on the outer peripheral surface of said sleeve, a nut received by said worm thread, one lateral side of said nut being provided with peripherally arranged serrations, and two stationary spaced abutments straddling said nut to limit the latter's axial movement a predetermined amount, one of said abutments having a tooth disposed to cooperatively engage said serrations to prevent selectively the rotation of said nut on said worm thread.

14. An adjusting device for a brake mechanism comprising an externally threaded first member, a second member threadedly received on said first member, two spaced abutments, a third member threadedly received on said second member and movable therewith between said abutments, the threads between the first two members having a smaller pitch than the threads between the second and third members, and stationary means selectively engageable with said third member to prevent the latter from turning on said second member.

15. An adjusting device for a vehicle brake mechanism comprising an externally threaded first member adapted to be held against rotation about the axis of the threads, a second member threadedly received on said first member, a third member drivably associated with said second member for rotating the latter during braking in one direction of vehicle movement and to rotate relative to the latter during braking in the other direction of vehicle movement, and means selectively engageable with said third member whereby said second member may be caused to rotate, said means including two spaced apart abutments which are engageable with opposite sides of said third member.

16. A brake mechanism for use with a rotatable drum comprising a radially expansible friction device having at least two adjacent adjustable ends, two spaced abutments secured to a non-rotatable member, and adjustor means connected to said ends to automatically vary the distance between said ends, said means being preset by brake applications for one direction of drum rotation between said two spaced abutments and extendible to adjust the distance between the ends of said friction device by contact with one of said abutments when the brake is applied during rotation of the drum in the opposite direction.

17. An adjusting device comprising a first member, a second member threadedly received on said first member, a third member carried by said second member and having limited movement therewith, and stationary means providing predetermined abutments engageable with said third member at one side to produce rotation of said third member and at the other side to produce rotation of said second member.

18. An adjusting mechanism comprising an externally threaded first member, a second member threadedly received on said first member, stationary means having two spaced abutments, a third member rotatably mounted on said second member and engageable with one of said abutments to be rotated thereby and with the other abutment to cause rotation of said second member for producing relative longitudinal movement of said first and second members.

19. In a brake, in combination, a support, first and second brake shoes having adjacent ends, a mechanism interposed between the adjacent ends for adjusting the brake for wear comprising two interconnected members arranged for axial adjustment from a predetermined setting, a wear sensing and actuating member interconnected with one of said two members and repositionable thereon by brake shoe rotation in one direction to sense brake wear, said last named member being acted upon by brake shoe rotation in the opposite direction to change the predetermined setting, and means carried by said support for engagement with said last named member for both directions of shoe rotation.

References Cited in the file of this patent

UNITED STATES PATENTS

| | | |
|---|---|---|
| 1,045,833 | Gomella | Dec. 3, 1912 |
| 1,837,473 | Neveu | Dec. 22, 1931 |
| 2,066,077 | Sanford et al. | Dec. 29, 1936 |
| 2,077,940 | Lafitte | Apr. 20, 1937 |
| 2,095,753 | La Brie | Oct. 12, 1937 |
| 2,134,564 | Lauer | Oct. 25, 1938 |
| 2,138,206 | Rasmussen et al. | Nov. 29, 1938 |
| 2,695,078 | Brooks | Nov. 23, 1954 |

FOREIGN PATENTS

| | | |
|---|---|---|
| 711,498 | Germany | Oct. 2, 1941 |